(12) United States Patent
Adragna et al.

(10) Patent No.: US 10,113,629 B2
(45) Date of Patent: Oct. 30, 2018

(54) SIDE PINION DIFFERENTIAL LOCKING MECHANISM

(71) Applicant: Caterpillar Inc., Peoria, IL (US)

(72) Inventors: Omar J. Adragna, Peoria, IL (US); Amanda C. Doolittle, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 159 days.

(21) Appl. No.: 15/367,867

(22) Filed: Dec. 2, 2016

(65) Prior Publication Data
US 2018/0156323 A1 Jun. 7, 2018

(51) Int. Cl.
| | |
|---|---|
| *F16H 48/20* | (2012.01) |
| *F16H 48/32* | (2012.01) |
| *F16H 48/08* | (2006.01) |
| *B60K 17/34* | (2006.01) |
| *B60K 23/04* | (2006.01) |
| *B60K 17/36* | (2006.01) |
| *B60K 23/08* | (2006.01) |

(52) U.S. Cl.
CPC ............. *F16H 48/32* (2013.01); *B60K 17/34* (2013.01); *B60K 17/36* (2013.01); *B60K 23/04* (2013.01); *F16H 48/08* (2013.01); *B60K 2023/046* (2013.01); *B60K 2023/0866* (2013.01); *F16H 2048/201* (2013.01)

(58) Field of Classification Search
CPC ... F16H 2048/201; F16H 48/32; B60K 17/34; B60K 17/344; B60K 17/346; B60K 17/3462; B60K 23/04; B60K 2023/046; B60K 2023/085; B60K 2023/0823; B60K 2023/0858; B60K 2023/0841; B60K 2023/0875; B60K 2023/0866

USPC .................................................. 475/231, 234
See application file for complete search history.

(56) References Cited

U.S. PATENT DOCUMENTS

| | | | | |
|---|---|---|---|---|
| 5,098,360 A | * | 3/1992 | Hirota .................... | F16H 48/08 475/231 |
| 5,531,653 A | * | 7/1996 | Barnholt ................. | F16H 48/08 475/234 |
| 5,984,823 A | | 11/1999 | Gage | |
| 6,063,000 A | * | 5/2000 | Sugimoto ............... | F16H 48/08 475/231 |

(Continued)

FOREIGN PATENT DOCUMENTS

| | | | | |
|---|---|---|---|---|
| CA | 2740983 A1 | * | 7/2010 | .......... F16H 48/285 |
| GB | 2235502 | * | 6/1991 | ............... F16H 1/44 |
| WO | WO-2010077173 A1 | * | 7/2010 | .......... F16H 48/285 |

*Primary Examiner* — Jeffrey A Shapiro
(74) *Attorney, Agent, or Firm* — Miller, Matthias & Hull

(57) ABSTRACT

A differential assembly is disclosed, including a housing forming an interior space, and a shaft may extend into a portion of the interior space of the housing. A side gear including an aperture may be arranged within the interior space and an end portion of the shaft is aligned and extends through the aperture. The differential assembly may further include a sliding sleeve configured with a flat flange portion, the sliding sleeve may extend through the aperture and slide over the end portion of the shaft. Furthermore, a pinion gear may be configured with a flat face portion and a pinion gear cam portion may be configured to extend axially away from the flat face portion of the pinion gear. An actuator may actuate the sliding sleeve between a sleeve first position and a sleeve second position and the flat flange portion may interact with the pinion gear cam portion.

20 Claims, 5 Drawing Sheets

(56) References Cited

U.S. PATENT DOCUMENTS

| | | | | |
|---|---|---|---|---|
| 6,524,211 B2* | 2/2003 | Okazaki | ................. | F16H 48/08 |
| | | | | 475/231 |
| 6,533,699 B1* | 3/2003 | Fett | ........................ | F16H 48/22 |
| | | | | 475/231 |
| 8,043,188 B2 | 10/2011 | Ziech | | |
| 2002/0006845 A1* | 1/2002 | Okazaki | ................. | F16H 48/08 |
| | | | | 475/231 |
| 2002/0132694 A1* | 9/2002 | Okazaki | ................. | F16H 48/08 |
| | | | | 475/231 |
| 2014/0148297 A1* | 5/2014 | Tomimatu | ............... | F16H 48/22 |
| | | | | 475/231 |
| 2014/0235397 A1* | 8/2014 | McMillan | ............... | F16H 48/24 |
| | | | | 475/231 |

* cited by examiner

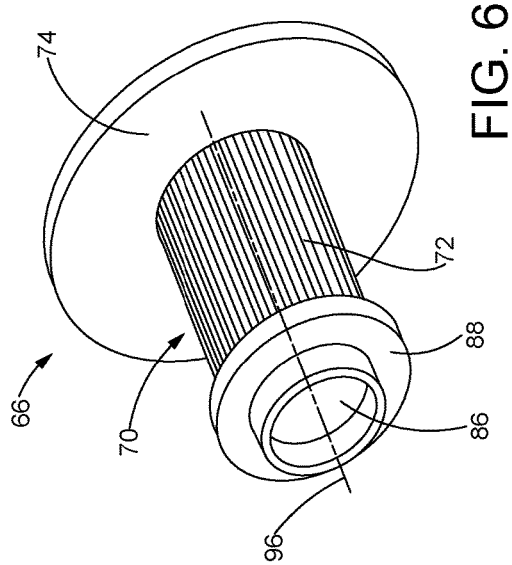
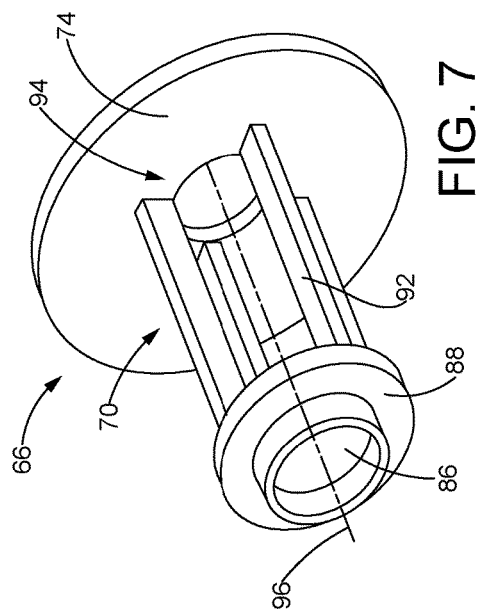
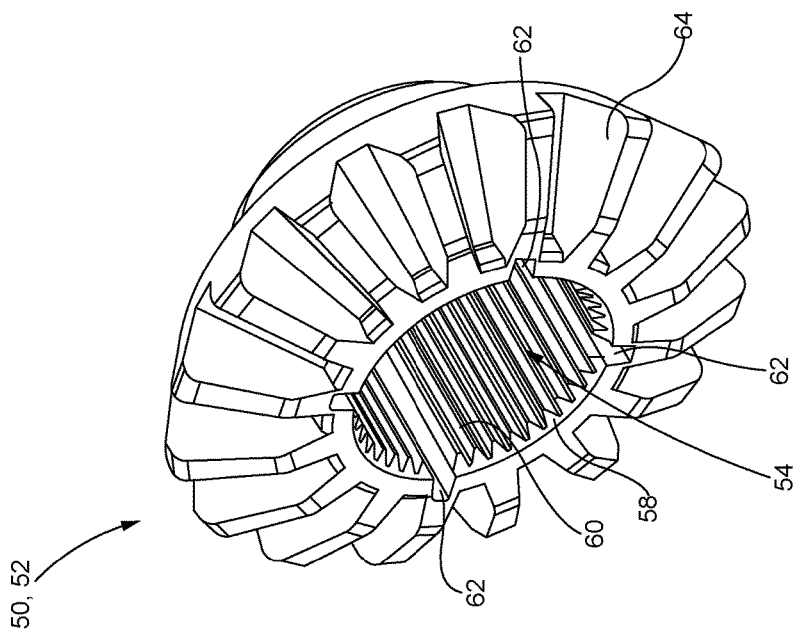

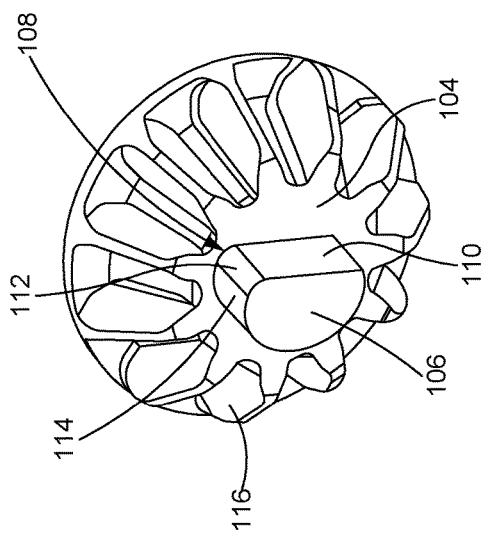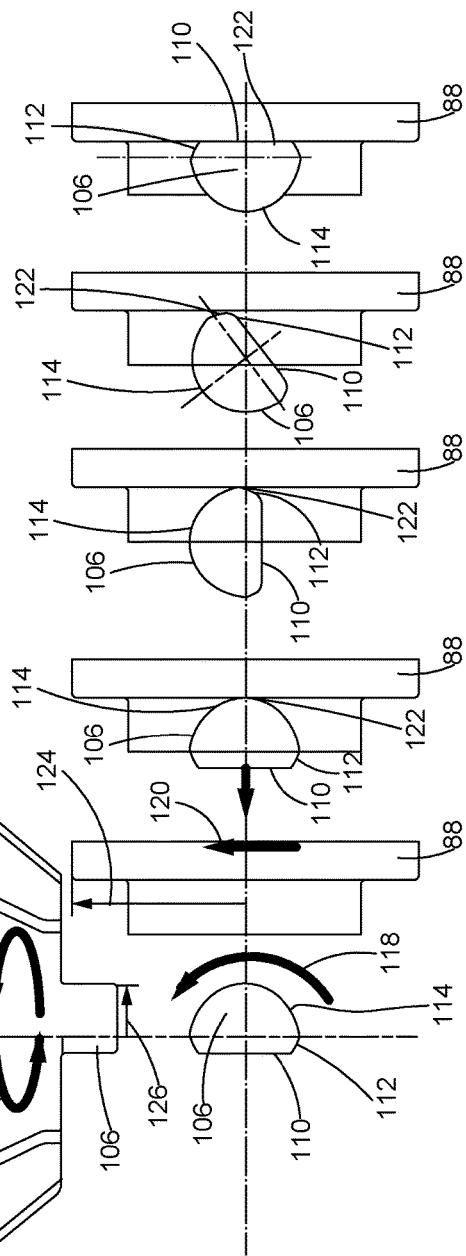

SIDE PINION DIFFERENTIAL LOCKING MECHANISM

FIELD OF THE DISCLOSURE

The present disclosure relates generally to a differential assembly and, more particularly, relates to a locking mechanism for a differential assembly.

BACKGROUND OF THE DISCLOSURE

Work machines, such as articulated trucks, off-road machines, on-road machines, motor graders, dozers, and the like may be used in mining, construction, agriculture, petroleum, and other such industrial applications. During operation, the work machine may travel and maneuver around a work site that includes a variety of different terrains such as, steep inclines and descents, loose gravel and dirt, sharp turns, uneven pathways, and other such variable terrain. Furthermore, the work machine may be configured to haul or otherwise transport heavy loads from one location of the work site to another. In some cases, transporting heavy loads across the variable terrain may affect the traction and mobility of the work machine. As a result, the work machine power train may be configured to deliver power and torque to the drive axles based on the response of the work machine to the variable terrain, heavy loads, and other such operational conditions.

Typically, the work machine may include one or more differential assemblies incorporated into the power train. Furthermore, the differential assembly may be disposed or otherwise positioned between the right and left axle shaft of each drive axle. Furthermore, the differential assembly may be configured to transfer torque and power to right and left axle shafts of the drive axle. The differential assembly may include one or more operational modes such as an open mode and a locked mode. When the differential assembly operates in the open mode, the right and left axle shafts may be allowed to rotate at different speeds. In the open mode, the torque may be equally distributed between the right and left axle shaft to provide the same rotational force to each ground engaging element (i.e., wheel). However, each ground engaging element may rotate at a different speed. Alternatively, in the locked mode the differential assembly may lock the right and left axle shaft together such that each ground engaging element may be forced to rotate together.

Furthermore, depending on the operational mode, the differential assembly may modify the torque transfer pathway from the differential assembly to the right and left axle shafts. For example, in some differential assemblies the torque may follow a direct path in the open operational mode and an indirect path in the locked operational mode. The indirect torque transfer path may be established through one or more joint faces that are coupled together by bolts, pins, welds, or other such coupling device. However, the joint faces may be repeatedly exposed to friction and other sliding forces during the torque transfer. In some situations, the frictional forces may reduce the efficiency and reliability of the differential assembly. As a result, it may be desired to configure the differential assembly to provide a direct torque transfer pathway in both the open and locked operational modes.

A differential for a vehicle is disclosed in U.S. Pat. No. 8,043,188 entitled, "Spider-less Vehicle Differential," (the '188 patent). The differential disclosed therein is equipped with a ring gear having a plurality of spaced apart recesses. The differential of the '188 patent further includes one side pinion located in each recess of the ring gear. Furthermore, a heel end of the side pinion gear is located against a side pinion seat surface defined in each of the recess of the ring gear. The rotational motion from the ring gear is transferred directly to the side pinions through side walls which are defined by each recess of the ring gear.

While the '188 patent shows a direct rotational force path, it fails to disclose a differential having a locking operational mode which utilizes the direct rotational force transfer pathway.

SUMMARY OF THE DISCLOSURE

In accordance with one embodiment, a differential assembly is disclosed. The differential assembly may include a housing forming an interior space of the differential assembly. Additionally, the differential assembly may include a shaft extending into a portion of the interior space of the housing and a side gear including an aperture may be arranged within the interior space such that an end portion of the shaft is aligned with and extends through the aperture. The differential assembly may further include a sliding sleeve configured with a flat flange portion, and the sliding sleeve may be configured to extend through the aperture and slide over the end portion of the shaft. The differential assembly may further include a pinion gear configured with a flat face portion and a plurality of pinion gear teeth circumferentially arranged around the pinion gear. The plurality of pinion gear teeth may be configured to mesh with a plurality of side gear teeth circumferentially arranged around the side gear. A pinion gear cam portion may be configured to extend axially away from the flat face portion of the pinion gear. Moreover, an actuator may be configured to actuate the sliding sleeve between a sleeve first position and a sleeve second position and the flat flange portion may be configured to interact with the pinion gear cam portion as the sliding sleeve moves between the sleeve first position and the sleeve second position.

In accordance with another embodiment, a drive axle including a differential assembly is disclosed. The drive axle may include a first axle shaft and a second axle shaft and a housing forming an interior space of the differential assembly. The first axle shaft and the second axle shaft may be configured to extend into a portion of the interior space. The drive axle may further include a first side gear including a first aperture and a second side gear including a second aperture and the first side gear and the second side gear may be arranged within the interior space of the housing such that a first end portion of the first axle shaft is aligned with and extends through the first aperture and a second end portion of the second axle shaft is aligned with and extends through the second aperture. Moreover, the drive axle may include a sliding sleeve including a flat flange portion, and the sliding sleeve may be configured to extend through one of the first aperture and the second aperture and slide over the first end portion of the first axle shaft and towards the second end portion of the second axle shaft. The dive axle may further include at least one pinion gear including a flat face portion and a plurality of pinion gear teeth circumferentially arranged around the at least one pinion gear. The plurality of pinion gear teeth may be configured to mesh with a plurality of side gear teeth circumferentially arranged around the first side gear and the second side gear. A pinion gear cam portion may extend radially away from the flat face portion of the at least one pinion gear. The drive axle may further include an actuator configured to actuate the sliding sleeve between a sleeve first position and a sleeve second position and the flat flange portion may be configured to interact with the pinion gear cam portion as the sliding sleeve moves between the sleeve first position and the sleeve second position.

In accordance with yet another embodiment, a work machine is disclosed. The work machine may include a frame and an engine mounted onto the frame. A drive shaft may be operably coupled to the engine and configured to deliver power from the engine to a plurality of drive axles. The work machine may further include each drive axle configured with a differential assembly, and the differential assembly may include a housing which forms an interior space of the differential assembly. The work machine may further include a first axle shaft and a second axle shaft and each of the first axle shaft and the second axle shaft extending into a portion of the interior space. The work machine may further include a first side gear including a first aperture and a second side gear including a second aperture and the first side gear and the second side gear may be arranged within the interior space of the housing such that a first end portion of the first axle shaft is aligned with and extends through the first aperture and a second end portion of the second axle shaft is aligned with and extends through the second aperture. Moreover, a sliding sleeve may include a flat flange portion and the sliding sleeve may extend through one of the first aperture and the second aperture and configured to slide over one of the first end portion of the first axle shaft and the second end portion of the second axle shaft. The work machine may further include at least one pinion gear including a flat face portion and a plurality of pinion gear teeth circumferentially arranged around the at least one pinion gear. The plurality of pinion gear teeth may be configured to mesh with a plurality of side gear teeth circumferentially arranged around the first side gear and the second side gear. Moreover, a pinion gear cam portion may extend axially away from the flat face portion of the at least one pinion gear. The work machine may further include an actuator configured to actuate the sliding sleeve between a sleeve first position and a sleeve second position and the flat flange portion may be configured to interact with the pinion gear cam portion as the sliding sleeve moves between the sleeve first position and the sleeve second position.

These and other aspects and features of the present disclosure will be more readily understood upon reading the following detailed description in conjunction with the accompanying drawings.

BRIEF DESCRIPTION OF THE DRAWINGS

FIG. 5, is a perspective view of an exemplary side gear of the differential assembly of FIGS. 3 and 4, in accordance with an embodiment of the disclosure;

FIG. 6, is a perspective view of an exemplary sliding sleeve of the differential assembly of FIGS. 3 and 4, in accordance with an embodiment of the disclosure;

FIG. 7 is a perspective view of an alternative exemplary sliding sleeve of the differential assembly of FIGS. 3 and 4, in accordance with an embodiment of the disclosure;

FIG. 8, is a perspective view of an exemplary side pinion gear of the differential assembly of FIGS. 3 and 4 in accordance with an embodiment of the disclosure;

FIG. 9A, is a perspective view of an exemplary side pinion gear and a sectional view of an exemplary cam portion interacting with the flat flange portion, in accordance with an embodiment of the disclosure;

FIG. 9B, is another sectional view of an exemplary cam portion interacting with the flat flange portion, in accordance with an embodiment of the disclosure;

FIG. 9C, is another sectional view of an exemplary cam portion interacting with the flat flange portion, in accordance with an embodiment of the disclosure;

FIG. 9D, is another sectional view of an exemplary cam portion interacting with the flat flange portion, in accordance with an embodiment of the disclosure; and FIG. 9E, is another sectional view of an exemplary cam portion interacting with the flat flange portion, in accordance with an embodiment of the disclosure.

DETAILED DESCRIPTION

Figure 1:
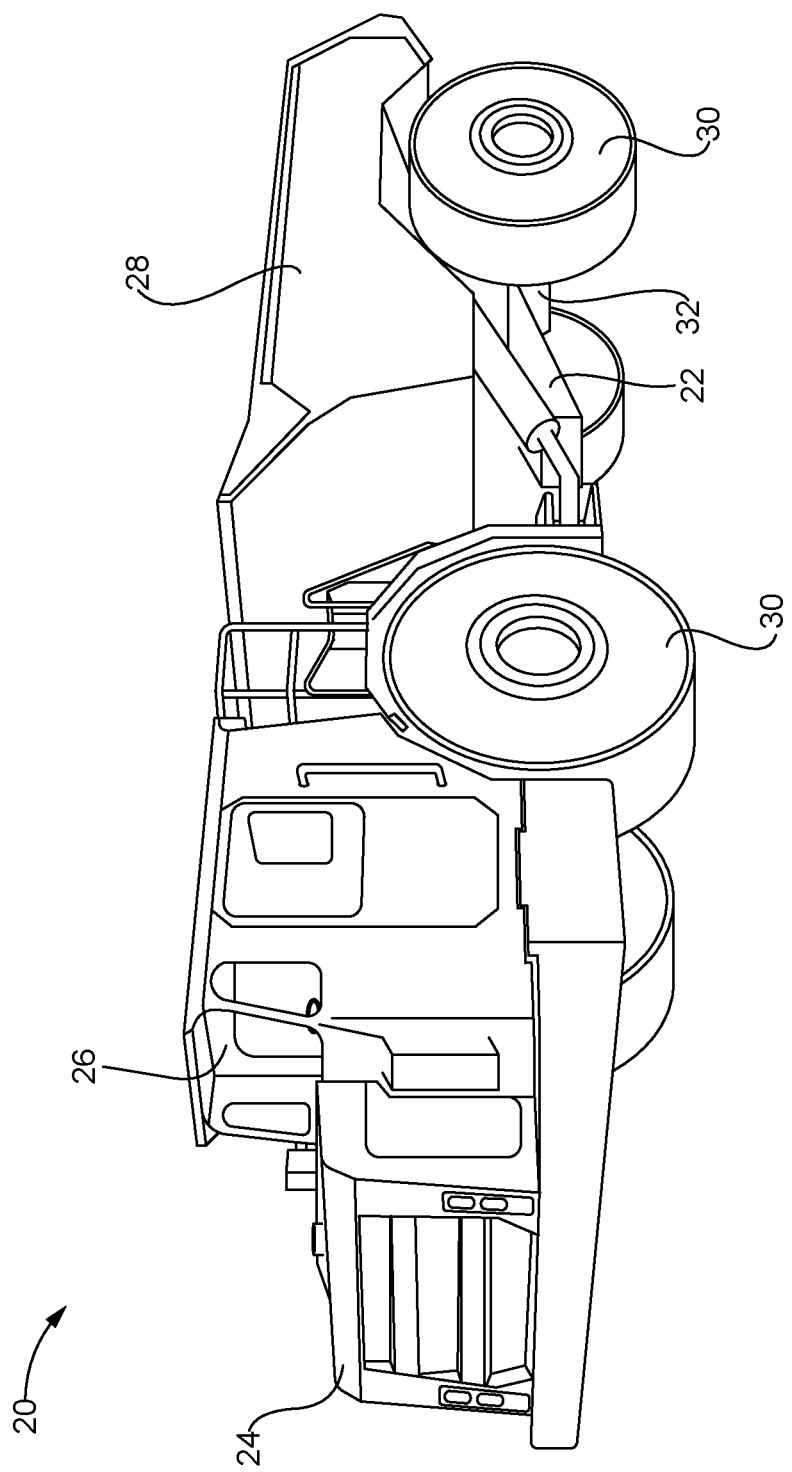
FIG. 1 is a perspective side view of a work machine, in accordance with an embodiment of the present disclosure.

Referring now to the drawings and with specific reference to FIG. 1, a work machine 20 is shown, in accordance with certain embodiments of the present disclosure. While one non-limiting example of the work machine 20 is illustrated as an articulated truck, it will be understood the work machine 20 may include other types of machines such as but not limited to, an on-road truck, an off-road truck, a motor grader, a dozer, a loader, or any other such machine. Furthermore, the work machine 20 may include a frame 22 configured to support an engine 24, an operator compartment 26, and a load bin 28 or other such machine attachment. The engine 24 may be a power generating source for the work machine 20 such as but not limited to, a diesel combustion engine, a gasoline combustion engine, a generator, an electric motor, or other known power generating source. The work machine 20 may further include a set of ground engaging elements 30 configured to support the frame 22. In some embodiments, the ground engaging elements 30 may be rotatably coupled to a drive axle 32 which may be driven by the engine 24 in order to propel the work machine 20 in a direction of travel.

As illustrated in FIG. 1, the work machine may be configured with pairs of ground engaging elements 30 (i.e., right/left front pair and right/left rear pair), and each pair of ground engaging elements 30 may be coupled to a drive axle 32. During operation, the work machine 20 may be configured such that the power generated by the engine 24 may be transferred through the drive axle 32 to each of the ground engaging elements 30. In one non-limiting example, the ground engaging elements 30 may be driven to produce a different rotational speed for each ground engaging element 30. Additionally or alternatively, in certain operational conditions, such as but not limited to, rough terrain, loose terrain, steep grades, or other such operational conditions, the ground engaging elements 30 may be driven such that each of the ground engaging elements 30 may be driven to produce the same rotational speed for each ground engaging element 30. FIG. 1 illustrates the set of ground engaging elements 30 as wheels. However, other types of ground engaging devices, such as continuous tracks and the like, may be used. Furthermore, it is to be understood that the work machine 20 is shown primarily for illustrative purposes to assist in disclosing features of various embodiments of the present disclosure, and that FIG. 1 may not depict all of the components of the work machine 20.

Figure 2:
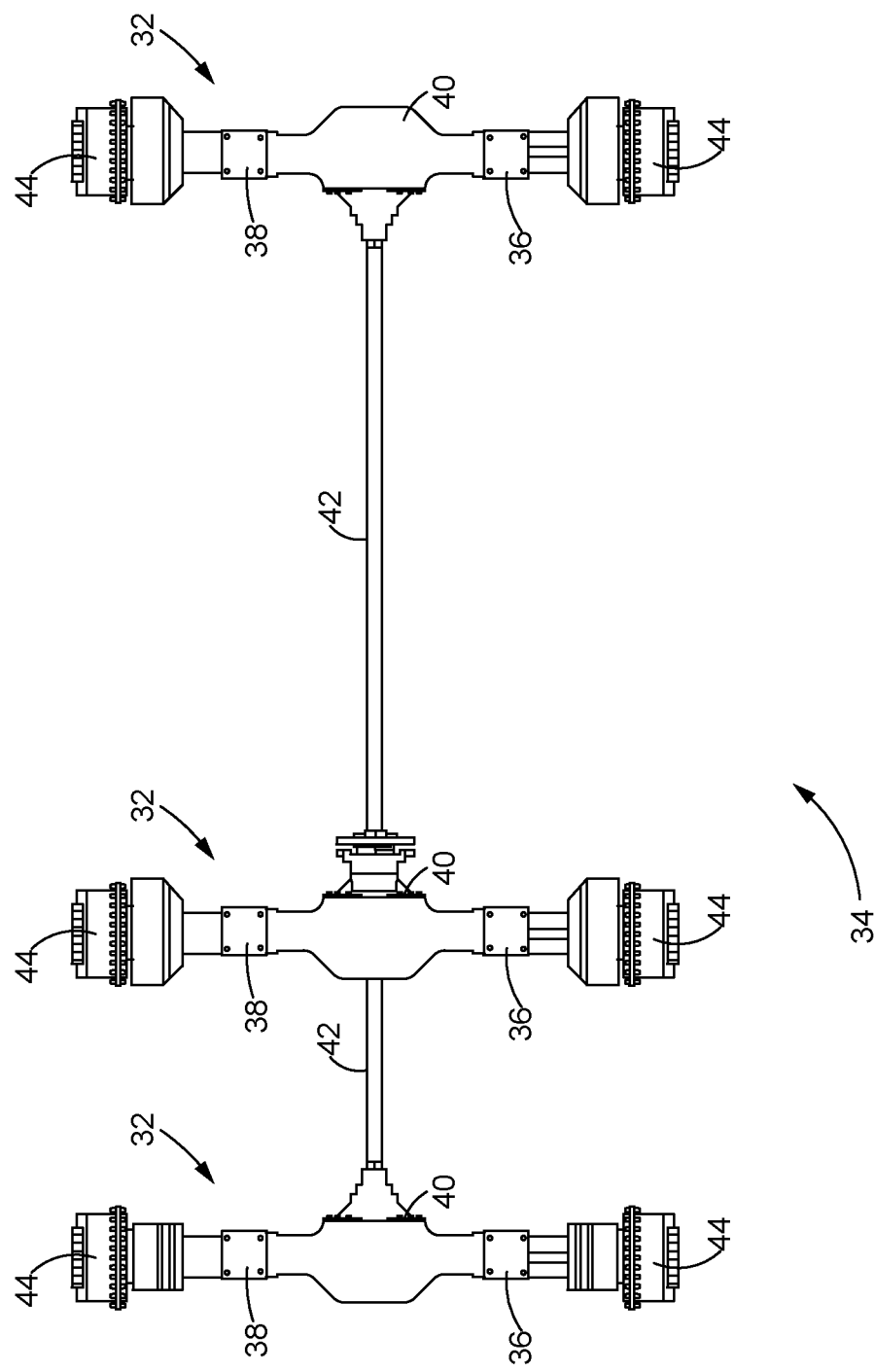
FIG. 2 is a top view of the power train of the work machine of FIG. 1, in accordance an embodiment of the present disclosure.

Referring now to FIG. 2, with continued reference to FIG. 1, a portion of the power train 34 of the work machine 20 is shown. In one non-limiting example, the power train 34 may include a plurality of drive axles 32 and each drive axle 32 may be configured with a right axle shaft 36 and a left axle shaft 38. Moreover, each drive axle 32 may be further configured with a differential assembly 40 which is operably coupled to a drive shaft 42 and the right and left axle shafts 36, 38 of each drive axle 32. The drive shaft 42 may be configured to axially extend from a first differential assembly 40 to a second differential assembly 40 such that the power generated by the engine 24 (FIG. 1) may be transferred by the drive shaft 42 and differential assembly 40 to each drive axle 32 of the work machine 20. Additionally, the differential assembly 40 may be operably coupled to the right and left axle shafts 36, 38 of each drive axle 32. In some embodiments, the right and left axle shafts 36, 38 may be oppositely arranged to extend axially outward from the differential assembly 40 to an outer drive portion 44 of the drive axle 32. In one non-limiting example the differential assembly 40 is configured to transfer power and torque from the engine 24 (FIG. 1) and the drive shaft 42 to the right and left axle shafts 36, 38 and the outer drive portion 44 of each drive axle 32. Moreover, each outer drive portion 44 of the drive axle 32 may be rotatably coupled with the ground engaging element 30 (FIG. 1). As the right and left axle shafts 36, 38 rotatably drive each outer drive portion 44, the ground engaging elements 30 may rotate to propel the work machine 20 in a direction (i.e., forward or reverse) of travel.

Figure 3:
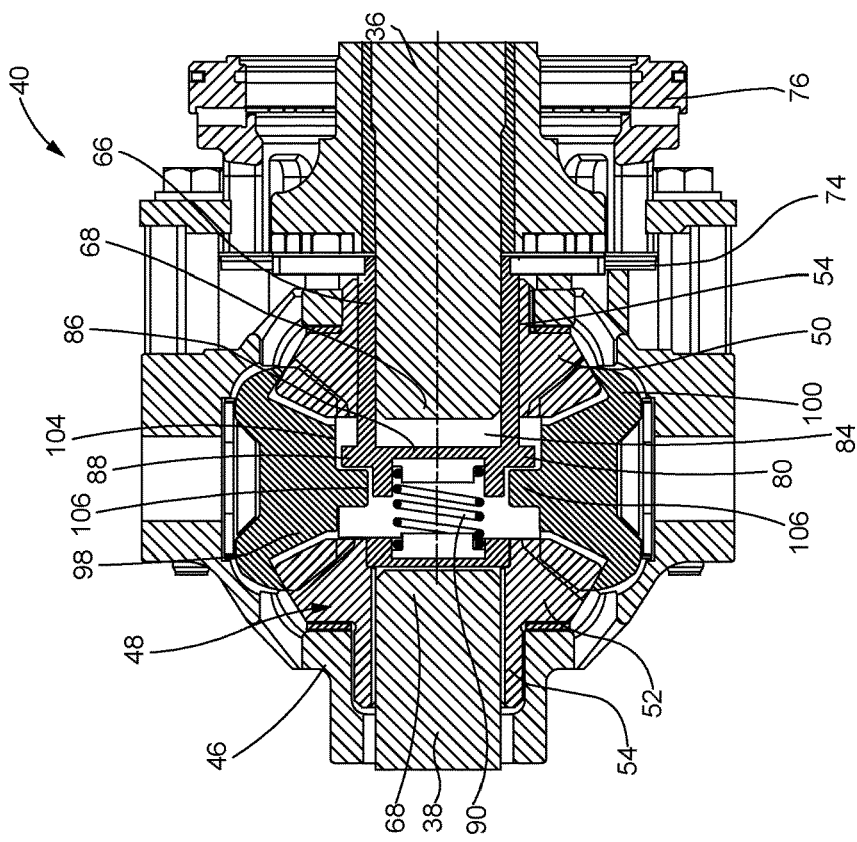
FIG. 3 is a sectional view of a differential assembly of the work machine of FIG. 1, in accordance with an embodiment of the disclosure.
Figure 4:
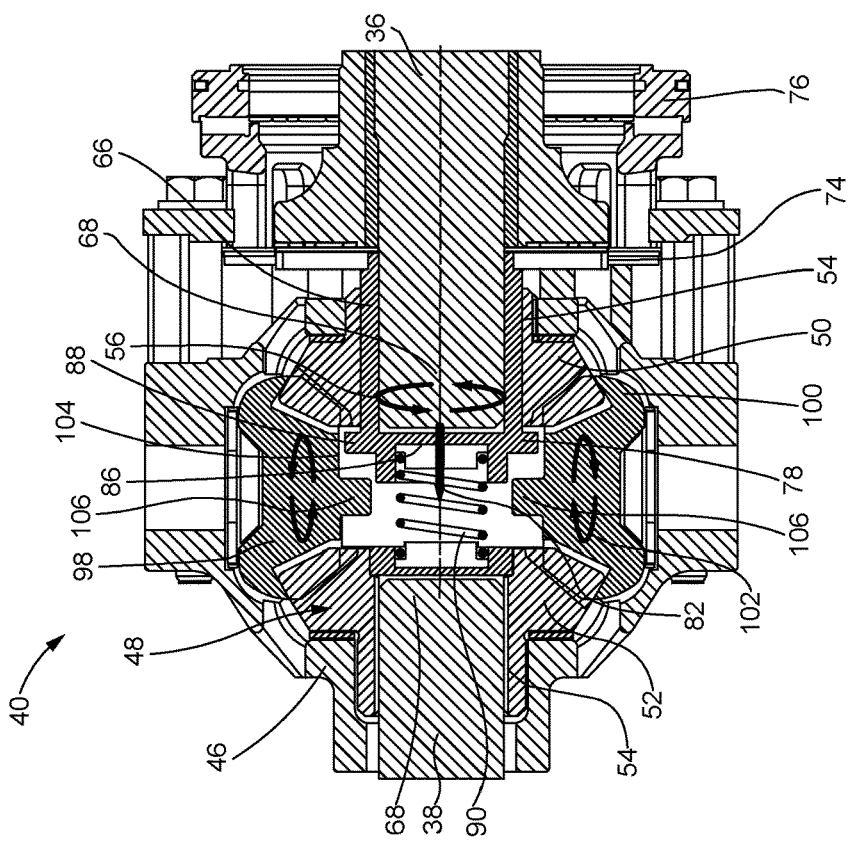
FIG. 4 is a sectional view of an exemplary differential assembly of the work machine of FIG. 1, in accordance with an embodiment of the disclosure.

Referring to FIGS. 3 and 4, with continued reference to FIG. 2, a sectional view of the differential assembly 40 is illustrated. In one non-limiting example, the differential assembly 40 may be referred to as a spiderless differential configured to provide a pathway to directly transfer torque, and other rotational force and energy, to the right and left axle shafts 36, 38. Furthermore, the differential assembly 40 may be configured to include at least two operational modes, such as an open operational mode and a locking operational mode. In one non-limiting example, when the differential assembly 40 is in the locking operational mode, the right and left axle shaft 36, 38 of the drive axle 32 may be synchronized together to produce a differential locking effect. As a result, the right and left axle shaft 36, 38 may be driven at the same, or substantially similar, rotational speed. Alternatively, when the differential assembly 40 is open or otherwise unlocked, the right and left axle shaft 36, 38 of the drive axle 32 may be independent of one another such that they are capable of being driven at different rotational speeds.

The differential assembly 40 may be configured with a differential housing 46 which includes an interior space 48 within the differential housing 46. Moreover, in some embodiments, the right axle shaft 36 and the left axle shaft 38 may extend into at least a portion of the interior space 48 of the differential housing 46. Furthermore, the interior space 48 may be configured to include a right side gear 50 and a left side gear 52, and a side gear aperture 54 may be formed extending through each of the right and left side gears 50, 52. Additionally, the side gear aperture 54 may be positioned near the center of the right and left side gears 50, 52 and sized or otherwise configured such that right axle shaft 36 extends through the side gear aperture 54 in the right side gear 50 and the left axle shaft 38 extends through the side gear aperture 54 in the left side gear 52. Furthermore, as illustrated in FIG. 3 by the side gear rotational arrows 56, the right and left side gears 50, 52 may be configured to rotate clockwise and/or counterclockwise within the interior space 48 of the differential housing 46. In some embodiments, the right and left axle shafts 36, 38 may be operably coupled to the right and left side gears 50, 52, respectively. As a result, the rotation of the right and left side gears 50, 52 may cause rotation of the right and left axle shafts 36, 38.

Referring to FIG. 5, an exemplary right and left side gear 50, 52 is illustrated. As described above, the side gear 50, 52 may include the side gear aperture 54 positioned near the center and configured to extend through the side gear 50, 52. Moreover, the side gear aperture 54 may include an aperture surface 58 and the aperture surface 58 may be configured with a plurality of aperture splines 60 and a plurality of aperture slots 62 circumferentially arrayed around the aperture surface 58. In one non-limiting example, the aperture surface 58 is configured with a greater number of aperture splines 60 than aperture slots 62. However, other configuration and distribution of the aperture splines 60 and aperture slots 62 may be possible. The side gear 50, 52 may further include a plurality of side gear teeth 64 circumferentially arrayed around the side gear 50, 52.

Referring back to FIGS. 3 and 4, a sliding sleeve 66 may be configured to extend through the side gear aperture 54 of one of the right and left side gears 50, 52. Moreover, the sliding sleeve 66 may be configured to slide over an end portion 68 of the right axle shaft 36. Additionally, the right and left axle shafts 36, 38 may be configured with a plurality of splines (not shown) circumferentially arrayed around the end portion 68 of each of the right and left axle shafts 36, 38. In some embodiments, the plurality of splines (not shown) on the end portion 68 of the left axle shaft 38 may mate or otherwise mesh with the aperture splines 60 to operably couple the left axle shaft 38 to the left side gear 52. Furthermore, as illustrated in FIG. 6, the sliding sleeve 66 may be configured with a sliding sleeve body 70 which includes a plurality of sleeve external splines 72 circumferentially arrayed around an exterior surface of the sliding sleeve body 70 and internal splines (not shown) circumferentially arrayed around an interior surface of the sliding sleeve body 70. Moreover, the plurality of splines (not shown) on the end portion 68 of the right axle shaft 36 may mate or otherwise mesh with the plurality of splines (not shown) on the interior surface of the sliding sleeve body 70 to operably couple the right axle shaft 36 to the sliding sleeve 66. Additionally, the sliding sleeve 66 may be inserted through the side gear aperture 54 of the right side gear 50 such that the sleeve external splines 72 mate or otherwise mesh with the aperture splines 60 to operably couple the sliding sleeve 66 with the right axle shaft 36 and the right side gear 50. As a result, the right axle shaft 36, the sliding sleeve 66 and the right side gear 50 may all be configured to synchronously rotate with one another. While FIGS. 3 and 4 show the sliding sleeve 66 configured to slide over the end portion 68 of the right axle shaft 36, an alternate configuration of the differential assembly 40 may have the sliding sleeve 66 configured to extend through the side gear aperture 54 of the left side gear 52 and slide over the end portion 68 of left axle shaft 38.

As further shown in FIGS. 3 and 4, the sliding sleeve 66 may slide over and enclose the end portion 68 of the right axle shaft 36. As a result, the sliding sleeve 66 may also be slidingly engaged with the right axle shaft 36 such that the sliding sleeve 66 slides or otherwise moves along the plurality of splines (not shown) on the surface of the right axle shaft 36 end portion 68. In some embodiments, the sliding sleeve 66 may include a sleeve actuator flange 74 that is operably coupled to an actuator 76. The actuator 76 may interact with the sleeve actuator flange 74 such that when the actuator 76 is activated the sliding sleeve 66 may slide or otherwise move along the surface of the right axle shaft 36. The actuator 76 may be an actuating device such as but not limited to, a hydraulic actuating device configured to use and control pressurized hydraulic fluid to operate the actuator 76. However, other known actuating devices may be used.

FIGS. 3 and 4 illustrate one non-limiting example of the actuator 76 actuating the sliding sleeve 66 between a sleeve first position 78 (i.e., open differential position) and a sleeve second position 80 (i.e., locked differential position). When the actuator 76 is inactive or otherwise de-energized, the sliding sleeve 66 may be positioned at the sleeve first position 78 and when the actuator 76 is activated or otherwise energized, the sliding sleeve 66 may axially move along the right axle shaft 36 from the sleeve first position 78 to the sleeve second position 80, as illustrated by the sleeve movement arrow 82. Moreover, as the actuator 76 is activated, the sliding sleeve 66 may slide axially away from the end portion 68 of the right axle shaft 36. As a result, a gap 84 may form between the sliding sleeve 66 and the end portion 68 of the right axle shaft 36, as the sliding sleeve 66 moves from the sleeve first position 78 to the sleeve second position 80. In some embodiments, the sliding sleeve 66 may be configured to further include a sleeve central portion 86 and a flat flange portion 88. The sleeve central portion 86 may be configured to operably engage or otherwise couples with an actuator return spring 90 positioned within the differential housing 46. In one non-limiting example, the actuator return spring 90 may be positioned between the right and left axle shaft 36, 38 and at least one end of the actuator return spring 90 may be configured to extend into the sleeve central portion 86 such that the actuator return spring 90 responds to axial movement of the sliding sleeve 66. Therefore, as shown in FIG. 4, the actuator return spring 90 may be compressed when the actuator 76 is activated causing the sliding sleeve 66 to slide or otherwise move from the sleeve first position 78 to the sleeve second position 80. In some embodiments, activation of the actuator 76 may produce an actuator force on the sliding sleeve 66 which is greater than the return spring force. As a result, the actuator force may maintain the sliding sleeve 66 in the sleeve second position 80. Conversely, when the actuator 76 is deactivated, the actuator return spring 90 may decompress or otherwise elongate, and release a stored return force or energy such that the sliding sleeve 66 moves axially from the sleeve second position 80 back to the sleeve first position 78. However, although the actuator return spring 90 is capable of axial movement in response to actuation of the sliding sleeve 66, the actuator return spring 90 may be configured to be isolated from rotation of the sliding sleeve 66 and the right and left side gears 50, 52.

Referring to FIGS. 6 and 7, two exemplary embodiments of the sliding sleeve 66 are illustrated. Generally, the sliding sleeve 66 is configured to include the sleeve actuator flange 74 which interacts with the actuator 76 (FIGS. 3 and 4). Additionally, the sliding sleeve 66 includes the sliding sleeve body 70 disposed between the sleeve central portion 86 and the flat flange portion 88 of the sliding sleeve. In some embodiments, the sliding sleeve body 70 extends axially away from the sleeve actuator flange 74 along a sliding sleeve axis 96 such that sleeve central portion 86 and the flat flange portion 88 are axially aligned along the sliding sleeve axis 96. As shown in FIG. 6, one non-limiting example of the sliding sleeve body 70 may be formed from a cylindrical structure which includes the plurality of sleeve external splines 72 circumferentially arrayed around the external surface of the sliding sleeve body 70. As discussed above, the sleeve external splines 72 may mate or otherwise mesh and be slidingly engaged with the aperture splines 60 (FIG. 5) of the right side gear 50. Alternatively, as illustrated in FIG. 7, the sliding sleeve body 70 may be defined by a plurality of sleeve body rods 92 and a sleeve body open space 94 between adjacent sleeve body rods 92. The sleeve body rods 92 may be configured to mate or otherwise mesh with the aperture slots 62 (FIG. 5) of the right side gear 50. Furthermore, during actuation of the sliding sleeve 66 the sleeve body rods 92 may be slidingly engaged with the aperture slots 62 (FIG. 5) as the sliding sleeve 66 moves between the sleeve first position 78 and the sleeve second position 80 (FIGS. 3 and 4). As a result, the sleeve body rods 92 and the aperture slots 62 may allow the sliding sleeve 66 to move between the sleeve first position 78 and the sleeve second position 80 without inducing axial frictional forces along the external splines (not shown) along the right axle shaft 36. It will be understood that while the non-limiting example of the sliding sleeve 66 illustrated in FIG. 7 incorporates four sleeve body rods 92 into the sliding sleeve body 70, an alternative number of sleeve body rods 92 may be used. For example, the sliding sleeve body 70 may incorporate as few as two sleeve body rods 92 and a greater number than four sleeve body rods 92 may be used.

Referring back to FIGS. 3 and 4, the differential assembly 40 may further include at least one side pinion gear 98, 100 arranged within the interior space 48. In one non-limiting example, the differential assembly 40 may include a top side pinion gear 98 and a bottom side pinion gear 100 adjacently positioned in an orthogonal orientation relative to the right and left side gears 50, 52. Furthermore, the top and bottom side pinion gears 98, 100 may be configured to rotate in the clockwise and/or counterclockwise direction within the interior space 48 of the differential housing 46, as illustrated by the pinion gear rotational arrows 102. Additionally, the top and bottom side pinion gears 98, 100 may each have a flat face portion 104 and a cam portion 106 that extends axially away from the flat face portion 104. In some embodiments, the cam portion 106 is configured to interact with the flat flange portion 88 of the sliding sleeve 66. As illustrated in FIGS. 3 and 4, when the sliding sleeve 66 actuates or otherwise moves from the sleeve first position 78 into the sleeve second position 80, the cam portion 106 of the top and bottom side pinion gear 98, 100 may interact with the flat flange portion 88 of the sliding sleeve 66 to produce a differential locking action of the differential assembly 40.

FIG. 8 provides a perspective view of an exemplary embodiment of the top and bottom side pinion gears 98, 100. The side pinion gear 98, 100 includes the flat face portion 104 and the cam portion 106 extending axially away from the flat face portion 104. In some embodiments, the cam portion 106 may be formed having a certain profile which may influence the interaction between the cam portion 106 and the flat flange portion 88 of the sliding sleeve 66 (as shown FIGS. 3 and 4). For example, the cam portion 106 may have a partial circular profile (i.e., a circle with circular segment removed). Furthermore, the cam portion 106 may have a cam surface 108 which includes a locking section 110, a transition section 112, and a contact section 114. It will be understood that the cam portion 106 may be configured with alternative cam profiles as needed such as but not limited to, producing a cam profile of the cam surface 108 having a plurality of locking sections 110, a plurality of transition sections 112, and a plurality of contact sections 114.

Additionally, the side pinion gear 98, 100 may be configured with a plurality of pinion gear teeth 116 circumferentially arrayed around the side pinion gear 98, 100. As shown in FIGS. 3 and 4, the top and bottom side pinion gears 98, 100 may be adjacently positioned with the right and left side gears 50, 52. The pinion gear teeth 116 of the top and bottom side pinion gears 98, 100 may mate or otherwise mesh with the side gear teeth 64 (FIG. 5) such that the top and bottom side pinion gears 98, 100 and the right and left side gears 50, 52 may synchronously rotate within the interior space 48 of the differential housing 46. As a result, the cam portion 106 may rotate along with the top and bottom side pinion gears 98, 100. The top and bottom side pinion gears 98, 100 and the right and left side gears 50, 52 may be configured to rotate in a clockwise direction and/or a counterclockwise direction.

Referring now to FIG. 9, with continued reference to FIGS. 3 and 4, an exemplary interaction sequence between the cam portion 106 of the side pinion gear 98, 100 and the flat flange portion 88 of the sliding sleeve 66 is shown. For purposes of simplicity, FIGS. 9A-9E illustrate the interaction between a single cam portion 106 and flat flange portion 88. However, as shown in FIGS. 3 and 4, some embodiments may incorporate at least two side pinion gears 98, 100, with each side pinion gear 98, 100 having at least one cam portion 106. Furthermore, each of the cam portions 106 of the top and bottom side pinion gears 98, 100 are configured such that the locking section 110 of the top side pinion gear 98 is in a coincident plane with the locking section 110 of the bottom side pinion gear 100. As a result, when the sliding sleeve 66 is actuated from the sleeve first position 78 to the sleeve second position 80, both locking sections 110 may interact with the flat flange portion 88 to produce a stronger locking effect of the differential assembly 40.

As discussed above, the top and bottom side pinion gears 98, 100 may be configured to synchronously rotate with the right and left side gears 50, 52. Furthermore, the sliding sleeve 66 may be operably coupled with and configured to rotate along with the right side gear 50. As a result, the cam portion 106 of the top and bottom side pinion gears 98, 100 may rotate in a synchronous direction as the flat flange portion 88 of the sliding sleeve 66. However, as further shown in FIG. 9A, the side pinion tangential velocity 118 and the flat flange tangential velocity 120 may not be equal at a contact point 122 between the cam portion 106 and the flat flange portion 88. In some embodiments, the cam portion 106 and the flat flange portion 88 may be configured such that the side pinion tangential velocity 118 and the flat flange tangential velocity 120 are close to being equal in order to minimize a sliding interaction that may occur between the cam portion 106 and the flat flange portion 88 as the sliding sleeve 66 is moved into the sleeve second position 80 (as shown in FIG. 4). In one non-limiting example, to keep the side pinion tangential velocity 118 and the flat flange tangential velocity 120 close to being equal, a ratio between the flat flange radius 124 and the cam portion radius 126 is configured to be the same as a ratio between the number of side gear teeth 64 of the side gear 50, 52 (FIG. 5) and the number of pinion gear teeth 116 of the side pinion gear 98, 100 (FIG. 8).

FIGS. 9A-9E provide one non-limiting example of the interaction between the cam portion 106 of the top and bottom pinion gears 98, 100 and the flat flange portion 88 of the sliding sleeve 66. FIG. 9A illustrates the flat flange portion 88 in the sleeve first position 78 (i.e., open or unlocked position) (as shown in FIG. 3). The cam portion 106 and flat flange portion 88 may be rotating in the same direction and in a non-contact position with respect to one another. Furthermore, as shown in FIG. 9B, when the sliding sleeve 66 is first actuated into the sleeve second position 80 (i.e., locked position), the cam portion 106 and the flat flange portion 88 may come into direct contact with one another at a contact point 122. Furthermore, the synchronous rotation of top and bottom side pinion gears 98, 100 and the right side gear 50 may allow the flat flange portion 88 to contact the cam portion 106 at any of the locking section 110, the transition section 112, or the contact section 114. However, as the top and bottom side pinion gears 98, 100 and the right side gear 50 continue to rotate the contact point 122 between the cam portion 106 and the flat flange portion 88 may change. For example, as further shown in FIGS. 9B-9E, the contact point 122 between cam portion 106 and the flat flange portion 88 may progress from the contact section 114 through the transition section 112 until the locking section 110 of the cam portion 106 and the flat flange portion 88 are in direct contact with one another.

Once the sliding sleeve 66 is moved into the sleeve second position 80 (as shown in FIG. 4) the continuous interaction between the cam portion 106 and the flat flange portion 88 may cause the locking section 110 of the cam portion 106 to come into direct contact with the flat flange portion 88. In some embodiments, once the locking section 110 of the cam portion 106 and the flat flange portion 88 are in full contact with one another at the contact point 122, the actuator 76 (FIGS. 3 and 4) may increase the contact pressure until the differential assembly 40 (FIGS. 3 and 4) reaches its final locking position. Furthermore, in order to provide a smooth engagement between the cam portion 106 and the flat flange portion 88, the actuator 76 (FIGS. 3 and 4) may be configured to produce a modulated actuation of the sliding sleeve 66 (FIGS. 3 and 4) as it axially moves between the sleeve first position 78 and the sleeve second position 80. Additionally, in some embodiments, a crowning or other such surface modification of the locking section 110 may be performed to improve the engagement between the cam portion 106 and the flat flange portion 88. In one non-limiting example, the crowing of the locking section 110 may include a height difference of 0.1 to 0.5 mm between the flat portion and the top of the crown portion of the locking section 110. However, other crowing geometries or surface modifications may be used to improve the engagement between the cam portion 106 and the flat flange portion 88. In some embodiments, surface modification may be performed on the flat flange portion 88 of the sliding sleeve 66 to improve engagement between the cam portion 106 and the flat flange portion 88.

INDUSTRIAL APPLICABILITY

In general, the present disclosure may find utility in various industrial applications, including but not limited to, managing torque distribution between power train components. In some embodiments, a differential assembly may be incorporated into work machines and equipment used in mining, construction, earthmoving, agricultural, forestry and other such industries. In particular, the disclosed differential assembly may be incorporated into the power train systems of articulated trucks, hauling machines, dump trucks, mining vehicles, on-highway vehicles, off-highway vehicles, track-type machines, motor graders, loaders, excavators, dozers, tractors, agricultural equipment, and the like.

The differential assembly 40 of the present disclosure may be used to deliver power and torque to the right and left axle shafts 36, 38 of each drive axle 32 of the work machine 20. Furthermore, the differential assembly 40 may be configured to operate in one or more operational modes, such as but not limited to, an open operational mode and a locked operational mode. Such methods of operation will now be described in detail. In one embodiment, when the differential assembly 40 operates in the open operational mode, the right and left axle shafts 36, 38 may be able to rotate at different rotational speeds. For example, in the open operational mode, the differential assembly 40 may allow the ground engaging elements 30 to rotate at different speeds in order to minimize skidding or scuffing of the ground engaging elements 30 while the work machine 20 initiates and completes a turn or other such maneuver. Alternatively, when the work machine 20 is controlled or otherwise operated in the locked mode, the right and axle shafts 36, 38 may be locked together by the differential assembly 40 such that the ground engaging elements 30 rotate with the same rotational speed. In the locked operational mode, each ground engaging element 30 may be able to apply as much rotational force as the traction under it will allow. In some embodiments, when the traction underneath each ground engaging element 30 differs (i.e., one element has poor traction and one element has better traction), the locked operational mode may provide improved traction of the ground engaging elements 30 over the open operational mode.

In some embodiments, the differential assembly 40 may include a differential housing 46 which defines an interior space 48 of the differential housing 46. Furthermore, the differential housing 46 may be configured such that a right and left side gear 50, 52 and a top and bottom side pinion gear 98, 100 are positioned and configured to rotate within the interior space 48. In one non-limiting example, the right and left side gear 50, 52 are orthogonal relative to the top and bottom side pinion gear 98, 100. Additionally, side gear teeth 64 of the right and left side gear 50, 52 may mesh with pinion gear teeth 116 of the top and bottom side pinion gear 98, 100 such that the right and left side gear 50, 52 and the top and bottom side pinion gear 98, 100 may synchronously rotate with one another in either a clockwise or counterclockwise direction.

The differential housing 46 may be further configured such that the right axle shaft 36 and the left axle shaft 38 may be inserted into at least a portion of the interior space 48. Moreover, each of the right and left side gear 50, 52 may include a side gear aperture 54 and an end portion 68 of the right and left axle shaft 36, 38 may be inserted through the side gear aperture 54 of the right and left side gear 50, 52 respectively. In some embodiments, the right and left axle shaft 36, 38 are operably and rotatably coupled to the right and left side gears 50, 52 such the right and left axle shaft 36, 38 may rotate along with the right and left side gears 50, 52.

In some embodiments, the differential assembly 40 may include a locking mechanism which may be configured to lock the right and left axle shaft 36, 38 together such that they rotate at the same speed. The locking mechanism may include a sliding sleeve 66 that is configured to slide over the end portion of the right axle shaft 36. The sliding sleeve 66 may be further configured to extend through the side gear aperture 54 of the right side gear 50 such that the sliding sleeve 66 is disposed between the right axle shaft 36 and the right side gear 50. The differential assembly 40 may further include an actuator 76 operably coupled to a sleeve actuator flange 74 such that the sliding sleeve 66 may be actuated to slide between a sleeve first position 78 and a sleeve second position 80 along the right axle shaft 36.

The top and bottom side pinion gears 98, 100 may be configured with a cam portion 106 which extends axially away from a flat face portion of the top and bottom side pinion gears 98, 100. In some embodiments, the cam portion 106 may be configured to interact with a flat flange portion 88 of the sliding sleeve 66. In one non-limiting example, when the sliding sleeve is actuated or otherwise moved into the sleeve second position 80, the cam portion 106 may come into direct contact with the flat flange portion 88 of the sliding sleeve 66 and lock the differential assembly 40. More specifically, the cam portion 106 may include a flat locking section 110 that produces the locking effect when the locking section 110 comes into direct contact with the flat flange portion 88. In some embodiments, the locking section 110 may be configured with a crowning along the surface of the locking section 110. In one non-limiting example, the crowning may be between 0.1-0.5 mm, however other dimensions may be used. The crowning of the locking section 110 may help minimize sliding between the cam portion 106 and the flat flange portion 88 and therefore improve the overall locking effect of the differential assembly 40.

The differential assembly 40 of the present disclosure may provide several advantages over other differential devices which may be in use. In a typical differential, the side pinion gears may be held by a spider shaft or other known component, and a clutch may be coupled to the spider shaft to form a mechanism to unlock and lock the right and left axle shafts of the drive axle. However, the mechanism using the spider shaft may include additional components which can add weight, decrease reliability, and increase the overall manufacturing costs of the differential assembly 40. Furthermore, the spider shaft mechanism may use an indirect torque transfer pathway which may include one or more joint faces. During operation, the joint faces and other such joints may be exposed to frictional forces, which over time may cause failure of the differential assembly. Conversely, the differential assembly 40 of the present disclosure may remove the spider shaft and focus on providing a direct torque transfer pathway.

Furthermore, the differential assembly 40 may include more than one side pinion gear. In one non-limiting example the differential assembly 40 may be configured with the top side pinion gear 98 and the bottom side pinion gear 100. However, it will be understood that an alternative or additional number of pinion gears may be used. In some embodiments, the top and bottom side pinion gear 98, 100 may be each configured with a cam portion 106 having at least one locking section 110. As a result, the differential assembly 40 may be configured with multiple locking sections 110 (i.e., one for each side pinion) that interact with the flat flange portion 88 of the sliding sleeve 66 to increase the overall locking effect of the differential assembly 40.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A differential assembly comprising:
   a housing forming an interior space of the differential assembly;
   a shaft extending into a portion of the interior space of the housing;
   a side gear including an aperture, the side gear arranged within the interior space such that an end portion of the shaft is aligned with and extends through the aperture;
   a sliding sleeve including a flat flange portion, the sliding sleeve configured to extend through the aperture and slide over the end portion of the shaft;
   a pinion gear including a flat face portion and a plurality of pinion gear teeth circumferentially arranged around the pinion gear, the plurality of pinion gear teeth configured to mesh with a plurality of side gear teeth circumferentially arranged around the side gear;
   a pinion gear cam portion extending axially away from the flat face portion; and
   an actuator configured to actuate the sliding sleeve between a sleeve first position and a sleeve second position and the flat flange portion configured to interact with the pinion gear cam portion as the sliding sleeve moves between the sleeve first position and the sleeve second position.

2. The differential assembly of claim 1, wherein the actuator includes a hydraulic actuator configured to supply a hydraulic pressure to actuate the sliding sleeve from the sleeve first position to the sleeve second position, and the actuator further includes a central spring configured to actuate the sliding sleeve from the sleeve second position back to the sleeve first position upon removal of the hydraulic pressure supplied by the hydraulic actuator.

3. The differential assembly of claim 1, wherein the sliding sleeve includes a sleeve body configured to circumferentially surround the end portion of the shaft, the sleeve body includes a set of external splines circumferentially arrayed around an exterior surface of the sleeve body, and the set of external splines configured to mesh with a set of side gear splines circumferentially arrayed around a surface of the aperture such that the sleeve body synchronously rotates along with the side gear.

4. The differential assembly of claim 1, wherein the sliding sleeve includes a sleeve body formed by at least two pushrods and an open body space disposed between the at least two pushrods, the at least two pushrods configured to mesh with a corresponding set of side gear slots formed in a surface of the aperture, and the at least two pushrods mesh with the corresponding set of side gear slots such that the sleeve body synchronously rotates along with the side gear.

5. The differential assembly of claim 1, wherein the pinion gear cam portion includes a cam portion profile defining a locking section, a transition section, and a contact section of the pinion gear cam portion, and the pinion gear rotates such that each of the locking section, the transition section and the contact section interact with the flat flange portion of the sliding sleeve.

6. The differential assembly of claim 5, wherein as the flat flange portion of the sliding sleeve moves into the sleeve second position the pinion gear cam portion interacts with the flat flange portion, and wherein the locking section of the cam portion profile comes into contact with the flat flange portion the actuator increases an actuation pressure to fully engage a locking position between the flat flange portion of the sliding sleeve and the pinion gear cam portion.

7. The differential assembly of claim 6, wherein the locking section of the cam portion profile includes a crowning along a locking section surface and the crowning is configured to facilitate full contact between the locking section and the flat flange portion.

8. A drive axle including a differential assembly, the drive axle comprising:
   a first axle shaft and a second axle shaft;
   a housing forming an interior space of the differential assembly and the first axle shaft and the second axle shaft extending into a portion of the interior space;
   a first side gear including a first aperture and a second side gear including a second aperture, the first side gear and the second side gear arranged within the interior space of the housing such that a first end portion of the first axle shaft is aligned with and extends through the first aperture and a second end portion of the second axle shaft is aligned with and extends through the second aperture;
   a sliding sleeve including a flat flange portion, the sliding sleeve extending through one of the first aperture and the second aperture and configured to slide over the first end portion of the first axle shaft and towards the second end portion of the second axle shaft;
   at least one pinion gear including a flat face portion and a plurality of pinion gear teeth circumferentially arranged around the at least one pinion gear, the plurality of pinion gear teeth configured to mesh with a plurality of side gear teeth circumferentially arranged around the first side gear and the second side gear;
   a pinion gear cam portion extending axially away from the flat face portion of the at least one pinion gear; and
   an actuator configured to actuate the sliding sleeve between a sleeve first position and a sleeve second position and the flat flange portion configured to interact with the pinion gear cam portion as the sliding sleeve moves between the sleeve first position and the sleeve second position.

9. The drive axle of claim 8, wherein the actuator includes a hydraulic actuator configured to supply a hydraulic pressure to actuate the sliding sleeve from the sleeve first position to the sleeve second position, and the actuator further includes a central spring configured to actuate the sliding sleeve from the sleeve second position back to the sleeve first position upon removal of the hydraulic pressure supplied by the hydraulic actuator.

10. The drive axle of claim 8, wherein the sliding sleeve includes a sleeve body configured to circumferentially surround one of the first end portion of the first axle shaft and the second end portion of the second axle shaft, the sleeve body includes a set of external splines circumferentially arrayed around an exterior surface of the sleeve body, and the set of external splines configured to mesh with a set of side gear splines circumferentially arrayed around one of a first surface of the first aperture and a second surface of the second aperture such that the sleeve body synchronously rotates along with one of the first side gear and the second side gear.

11. The drive axle of claim 8, wherein the sliding sleeve includes a sleeve body configured to circumferentially surround one of the first end portion of the first axle shaft and the second end portion of the second axle shaft, the sleeve body includes at least two pushrods and an open space disposed between the at least two pushrods, the at least two pushrods configured to mesh with a corresponding set of side gear slots formed in at least one of a first surface of the first aperture and a second surface of the second aperture, and the at least two pushrods mesh with the corresponding set of side gear slots such that the sleeve body synchronously rotates along with one of the first side gear and the second side gear.

12. The drive axle of claim 8, wherein the pinion gear cam portion includes a cam portion profile defining a locking section, a transition section, and a contact section of the pinion gear cam portion, and the at least one pinion gear rotates such that each of the locking section, the transition section, and the contact section configured is interact with the flat flange portion of the sliding sleeve.

13. The drive axle of claim 12, wherein as the flat flange portion of the sliding sleeve moves into the sleeve second position the pinion gear cam portion interacts with the flat flange portion, and wherein the locking section of the cam portion profile comes into contact with the flat flange portion the actuator increases an actuation pressure to fully engage a locking position between the flat flange portion of the sliding sleeve and the pinion gear cam portion.

14. The drive axle of claim 13, wherein the locking section of the cam portion profile includes a crowning along a locking section surface and the crowning is configured to facilitate full contact between the locking section and the flat flange portion.

15. A work machine including a comprising:
a frame;
an engine mounted onto the frame;
a drive shaft operably coupled to the engine and configured to deliver power from the engine to a plurality of drive axles, each drive axle of the plurality of drive axles comprising:
  a differential assembly including a housing and the housing forming an interior space of the differential assembly;
  a first axle shaft and a second axle shaft, each of the first axle shaft and the second axle shaft extending into a portion of the interior space;
  a first side gear including a first aperture and a second side gear including a second aperture, the first side gear and the second side gear arranged within the interior space of the housing such that a first end portion of the first axle shaft is aligned with and extends through the first aperture and a second end portion of the second axle shaft is aligned with and extends through the second aperture;
  a sliding sleeve including a flat flange portion, the sliding sleeve extending through one of the first aperture and the second aperture and configured to slide over the first end portion of the first axle shaft and towards the second end portion of the second axle shaft;
  at least one pinion gear including a flat face portion and a plurality of pinion gear teeth circumferentially arranged around the at least one pinion gear, the plurality of pinion gear teeth configured to mesh with a plurality of side gear teeth circumferentially arranged around the first side gear and the second side gear;
  a pinion gear cam portion extending axially away from the flat face portion of the at least one pinion gear; and
  an actuator configure to actuate the sliding sleeve between a sleeve first position and a sleeve second position and the flat flange portion configured to interact with the pinion gear cam portion as the sliding sleeve moves between the sleeve first position and the sleeve second position.

16. The work machine of claim 15, wherein the actuator includes a hydraulic actuator configured to supply a hydraulic pressure to actuate the sliding sleeve from the sleeve first position to the sleeve second position, and the actuator further includes a central spring configured to actuate the sliding sleeve from the sleeve second position back to the sleeve first position upon removal of the hydraulic pressure supplied by the hydraulic actuator.

17. The work machine of claim 15, wherein the sliding sleeve includes a sleeve body configured to circumferentially surround one of the first end portion of the first axle shaft and the second end portion of the second axle shaft, the sleeve body includes a set of external splines circumferentially arrayed around an exterior surface of the sleeve body, and the set of external splines configured to mesh with a set of side gear splines circumferentially arrayed around one of a first surface of the first aperture and a second surface of the second aperture such that the sleeve body synchronously rotates along with one of the first side gear and the second side gear.

18. The work machine of claim 15, wherein the sliding sleeve includes a sleeve body configured to circumferentially surround one of the first end portion of the first axle shaft and the second end portion of the second axle shaft, the sleeve body includes at least two pushrods and an open space disposed between the at least two pushrods, the at least two pushrods configured to mesh with a corresponding set of side gear slots formed in at least one of a first surface of the first aperture and a second surface of the second aperture, and the at least two pushrods mesh with the corresponding set of side gear slots such that the sleeve body synchronously rotates along with one of the first side gear and the second side gear.

19. The work machine of claim 18, wherein the pinion gear cam portion includes a cam portion profile defining a locking section, a transition section, and a contact section of the pinion gear cam portion, and the at least one pinion gear rotates such that each of the locking section, the transition section, and the contact section is configured to interact with the flat flange portion of the sliding sleeve.

20. The work machine of claim 19, wherein as the flat flange portion of the sliding sleeve moves into the sleeve second position the pinion gear cam portion interacts with the flat flange portion, wherein the locking section of the cam portion profile comes into contact with the flat flange portion, the actuator increases an actuation pressure to fully engage a locking position between the flat flange portion of the sliding sleeve and the pinion gear cam portion.

* * * * *